US011488256B1

(12) United States Patent
Schaps et al.

(10) Patent No.: US 11,488,256 B1
(45) Date of Patent: Nov. 1, 2022

(54) MACHINE LEARNING SYSTEMS, METHODS, COMPONENTS, AND SOFTWARE FOR RECOMMENDING AND ORDERING INDEPENDENT MEDICAL EXAMINATIONS

(71) Applicants: Raquel Emilia Schaps, Minneapolis, MN (US); Steven Cade Adams, Littleton, CO (US)

(72) Inventors: Raquel Emilia Schaps, Minneapolis, MN (US); Steven Cade Adams, Littleton, CO (US)

(73) Assignee: Infiniteintel, Inc., Lone Tree, CO (US)

( * ) Notice: Subject to any disclaimer, the term of this patent is extended or adjusted under 35 U.S.C. 154(b) by 0 days.

(21) Appl. No.: 17/485,187

(22) Filed: Sep. 24, 2021

Related U.S. Application Data

(63) Continuation-in-part of application No. 17/178,055, filed on Feb. 17, 2021, now abandoned.

(60) Provisional application No. 63/209,716, filed on Jun. 11, 2021, provisional application No. 62/977,696, filed on Feb. 17, 2020.

(51) Int. Cl.
| | |
|---|---|
| *G06N 20/00* | (2019.01) |
| *G06Q 10/10* | (2012.01) |
| *G16H 15/00* | (2018.01) |
| *G16H 50/20* | (2018.01) |
| *G06Q 40/08* | (2012.01) |
| *G06N 5/04* | (2006.01) |
| *G06N 5/02* | (2006.01) |

(52) U.S. Cl.
CPC ............ *G06Q 40/08* (2013.01); *G06N 5/022* (2013.01); *G06N 5/04* (2013.01)

(58) Field of Classification Search
CPC .......... G06Q 40/08; G06N 5/022; G06N 5/04
See application file for complete search history.

(56) References Cited

U.S. PATENT DOCUMENTS

| | | | |
|---|---|---|---|
| 9,336,482 B1 * | 5/2016 | Corrado | G06N 3/0472 |
| 11,270,384 B1 * | 3/2022 | Zhan | G06F 16/2477 |
| 2010/0241464 A1 * | 9/2010 | Amigo | A61B 5/112 |
| | | | 705/4 |
| 2011/0137672 A1 * | 6/2011 | Adams | G16H 50/20 |
| | | | 705/2 |

(Continued)

*Primary Examiner* — Brandon S Cole
(74) *Attorney, Agent, or Firm* — Fantastic IP Consulting; Eduardo E. Drake

(57) ABSTRACT

Millions of bodily injury insurance claims are filed yearly to help people who've suffered accidents from work, slip-and-falls, and auto collisions. In processing these claims, insurance companies, TPAs, and law firms routinely hire experts, such as physicians, to conduct independent medical evaluations (IMEs) to assist claims adjusters and attorneys in analyzing the eligibility of claimants for indemnity and medical benefit payments. IMEs typically cost thousands of dollars each. Yet, many are ordered too early, wasting money that could otherwise be used to reduce insurance premiums. To reduce this waste, the inventors devised, among other things, one or more exemplary systems which not only predict the outcomes of IMEs based on claimant medical records and/or or activity data before ordering them, but also presents selected claims and predictions within a graphical user interface that facilitates ordering the IMEs from a list of available physicians.

18 Claims, 3 Drawing Sheets

(56) References Cited

U.S. PATENT DOCUMENTS

| | | | |
|---|---|---|---|
| 2012/0284052 A1* | 11/2012 | Saukas | G06Q 10/00 705/3 |
| 2014/0149144 A1* | 5/2014 | Li | G06Q 10/10 705/4 |
| 2017/0116677 A1* | 4/2017 | Gray | G06F 16/22 |
| 2017/0132288 A1* | 5/2017 | Ho | G06F 40/30 |
| 2017/0154374 A1* | 6/2017 | Iglesias | G06Q 30/0629 |
| 2017/0185723 A1* | 6/2017 | McCallum | G16H 50/20 |
| 2017/0249417 A1* | 8/2017 | Gosieski, Jr. | G06F 1/163 |
| 2021/0383921 A1* | 12/2021 | Isobe | G16H 10/60 |

* cited by examiner

MACHINE LEARNING SYSTEMS, METHODS, COMPONENTS, AND SOFTWARE FOR RECOMMENDING AND ORDERING INDEPENDENT MEDICAL EXAMINATIONS

RELATED APPLICATIONS

The present application claims priority to U.S. Provisional Patent Application 63/209,716, filed Jun. 11, 2021, and to U.S. Non-Provisional Patent Application 17/178,055, filed Feb. 17, 2021, which itself claims priority to Provisional Patent Application 62/977,696 filed Feb. 17, 2020. All of these applications are incorporated herein by reference in their entirety.

COPYRIGHT NOTICE AND PERMISSION

A portion of this patent document contains material subject to copyright protection. The copyright owner has no objection to the facsimile reproduction by anyone of the patent document or the patent disclosure, as it appears in the patent and trademark office patent files or records, but otherwise reserves all copyrights whatsoever. The following notice applies to this document: Copyright © 2020-21, INFINITINTEL, INC.

TECHNICAL FIELD

Various embodiments of the invention relate generally to systems and methods for managing bodily injury insurance claims related to workers compensation, commercial liability, homeowners, and automobile insurance policies, particularly methods and processes for ordering independent medical examinations for such claims.

BACKGROUND

Millions of bodily injury insurance claims are filed every year, many stemming from work accidents, repetitive stresses, slip-and-fall accidents, and auto collisions. When an injury occurs, the injured person, known as a claimant, files a claim to receive benefits under the provisions of an insurance policy, for example a homeowner or automobile liability policy for personal insurance or a workers compensation or general liability policy for commercial insurance. Wage loss, medical expenses, rehabilitation, vocational, and disability benefits are the most often claimed insurance benefits for bodily injuries.

In administering or processing bodily injury claims, insurance companies and specialty companies that process claims (third-party administrators, or TPAs) employ claims adjusters. Claims adjusters collect and manually review medical records for filed claims and decide whether to accept or deny the benefit claims. Claims adjusters are also responsible for documenting the potential cost of claims to the insurance company. This cost estimates, which escalate with prolonged medical treatment expenses and lost-wage payments, are used by insurance company reserve managers to ensure that their insurance companies have sufficient cash reserves to not only cover the claim expenses, but also avoid legal fines for failure to maintain adequate reserves.

As an aid to determining the cost of claims and whether continued payment on open claims is appropriate, claims adjusters typically hire physicians to conduct independent medical evaluations (IMEs). IMEs help adjusters determine whether to accept or deny claimant assertions regarding medical conditions, continued medical care needs, treatment recommendations, work disability, work restrictions, and injury causation. In short, IMEs help adjusters determine when to close insurance claims that would otherwise stay open and result in payments for unnecessary medical expenses and wage loss benefits.

IMEs typically entail board-certified physicians studying claimant medical records, performing physical examinations, and authoring formal written reports that legally render and document their professional medical opinions regarding the condition and injury of insurance claimants. With this level of attention, each IME typically costs an insurer thousands of dollars. For insurers covering hundreds or even thousands of bodily injury claims every year, some of which may require multiple IMEs before closure, the annual cumulative cost of IMEs is not only significant, but also drives up the cost of providing insurance and ultimately the insurance premiums paid by businesses and individuals.

One of the present inventors, a former workers-compensation claims adjuster and current IME facilitator for insurance companies, has recognized that a significant percentage of IMEs indicate that claimants are not ready to return to work at the time the examination occurs. Indeed, this inventor's research indicates that at least 40% of the costly IMEs conducted in a particular sample set did not deem the examined claimant ready to return to work. Moreover, the research indicated that on average at least two IMEs per claimant were conducted before each claimant was released to return to work, again adding significantly to the insurance premiums paid by businesses and individuals in the insurance pool. Furthermore, the highly subjective nature of the medical records review by claims adjusters leads to inconsistent decisions about IME scheduling and claim administration, both by the same adjuster on similar claims, and across multiple adjusters within an insurance company or claims processer, potentially feeding concerns about administrative impartiality and fairness.

Accordingly, the present inventors—one, the mentioned former claims adjuster and the other, a data scientist— have recognized a need to improve the process of scheduling IMEs for bodily injury claims, particularly claims related to automobile, workers compensation, and general liability insurance.

SUMMARY

To address one or more of these and/or other needs or problems, the present inventors devised, among other things, one or more exemplary systems, methods, devices, assemblies, components, and/or software and graphical interfaces related to, among other things, predicting the readiness of claims for closure via an independent medical examination (IME), and/or to order independent medical examination in response to the readiness prediction or recommendation.

In some embodiments, the invention takes the form of system for predicting the outcomes of Independent Medical Examinations (IMEs) from electronic health records (EHR) using heuristic approaches and/or machine learning or artificial intelligence models. One exemplary system includes a learning module (neural network or machine learning program) configured to learn from a set of historical IME reports, and/or their associated medical records how to predict the outcome of future IMEs based only on medical records for a given injured claimant, for example a workers compensation insurance claimant. In some embodiments, those medical records include data from one or more sensors worn by or otherwise associated with or cognizant of the injured claimant. (The sensors may take the form of smartphones, smartwatches, implantable heart monitors, sensor suits, sleep monitors, pedometers, medical and non-medical surveillance systems.)

Additionally, some embodiments include or take the form of a graphical user interface that presents users (for example, claims adjusters or administrators, plaintiff attorneys, and defense attorneys) with an IME prediction based on current medical records (or elapsed time since onset of an injury or treatment). Some interfaces also provide a list of recommended IME providers for the particular injury and/or a list of recommend treatment providers who have a history of successfully treating similar conditions within an acceptable time and cost ranges. Still others include integrated physician data and/or ratings for various criteria, such IME turn-around times, medical qualifications, patient proximity, etc.

Moreover, some embodiments feedback the results of new IMEs ordered through the system and/or obtained elsewhere to update training the learning module, ensuring continually more accurate predictions of IME and/or treatment outcomes. In some embodiments, the conclusions from a batch of one or more IMEs that were recommended by the system are compared against the predictions. The medical data for those mis-predicted IMEs are then tagged and processed as new training data for one or more of the learning modules and/or classifiers in the system.

Some embodiments provide a software program or Software as a Service platform configured to pre-screen claimant medical records and eliminate or reduce premature IMEs and the associated time and financial waste. Some systems generate an automated graphical user interface output or report that lists one or more active insurance claims in association with an IME Ready or Not outcome score, prediction, or status indicator. In some embodiments, the report provides a timeline indicating when a claimant associated with a claim file is ready to be scheduled for an IME, with reminders and/or automatic scheduling features to avoid delays in scheduling and/or performance. The system in some variations provides useful guideline for users (for example, claims adjusters, administrators, and attorneys) that reduces risk of ordering, scheduling, and conducting premature IMEs. Some embodiments further leverage the IME readiness predictions to update financial models or reserve accounts for one or more of claims in a portfolio of insurance claims, enabling insurers and/or insurance underwriters to more accurately and dynamically comply with legal reserve requirements, while improving overall financial strength and performance.

BRIEF DESCRIPTION OF THE DRAWINGS

Various embodiments are described herein with reference to the following attached figures (Figs). These figures are annotated with reference numbers for various features and components, and these numbers are used in the following description as a teaching aid, with like numbers referring to the same or similar features and components.

DETAILED DESCRIPTION OF EXEMPLARY EMBODIMENTS

This document, which incorporates drawings and claims, describes one or more specific embodiments of one or more inventions. These embodiments, offered not to limit but only to exemplify and teach the invention, are shown and described in sufficient detail to enable those skilled in the art to implement or practice the invention(s). Thus, where appropriate to avoid obscuring the invention(s), the description may omit certain information known to those of skill in the art.

Exemplary System

Figure 1:
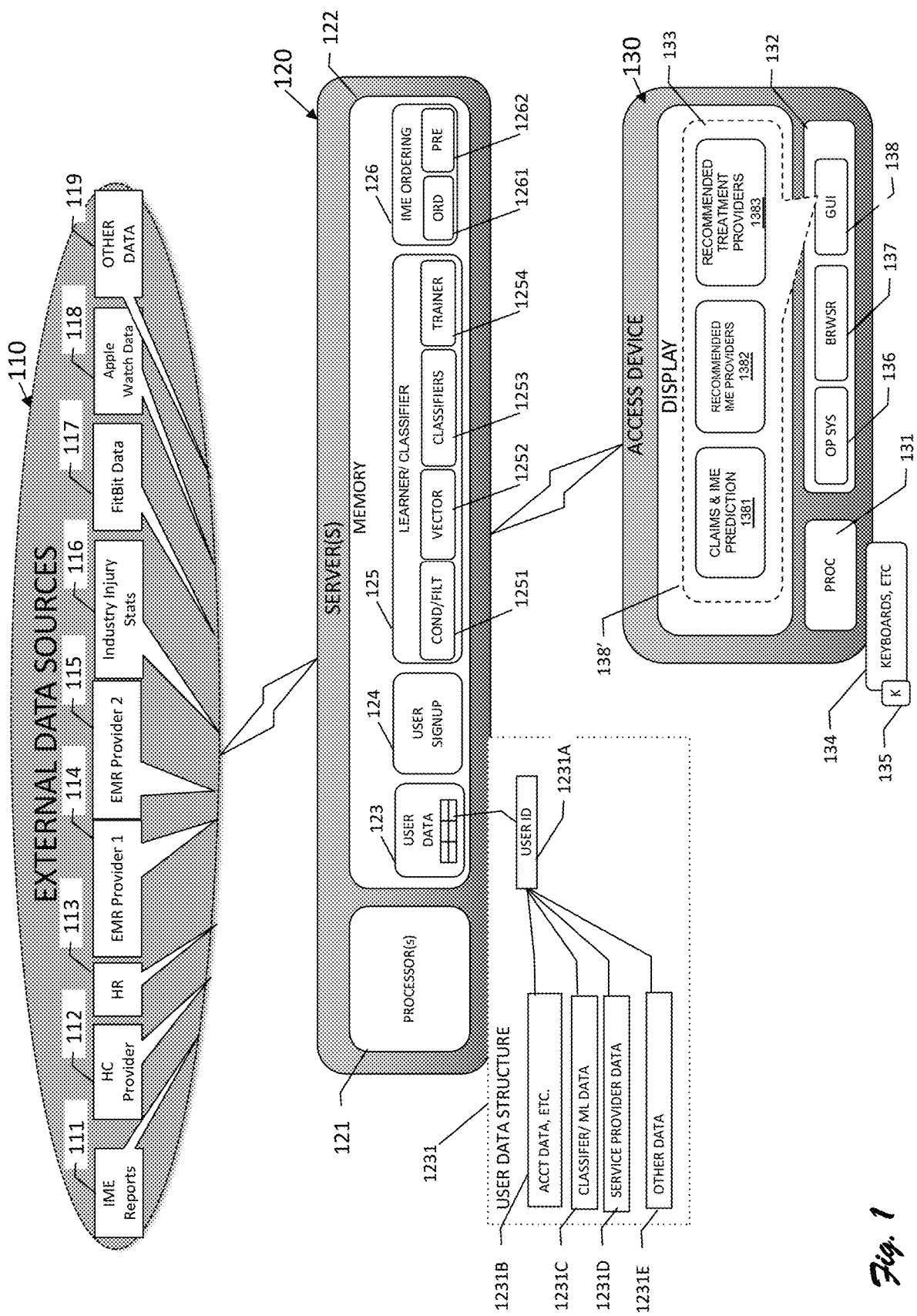
FIG. 1 is a conceptual block diagram of an exemplary medical record processing and medical examination ordering system corresponding to one or more embodiments of the present invention.

FIG. 1 is block diagram of an exemplary online IME prediction and ordering system 100, for implementing one or more of the features and functions described above and thus corresponding to one or more embodiments of the present invention. System 100 includes data sources 110, a server 120, and an access device 130.

Exemplary Data Sources

Data sources or databases 110, which take the exemplary form of one or more electronic, magnetic, or optical data-storage devices, include, among other things that may be implied or inferred elsewhere herein, repositories of medical records, DNA, fitness, and patient fitness or lifestyle behavioral data, de-identified (anonymized) and/or identified data In some embodiments, data sources 110 also includes physician and/or other medical provider identifying and credentialling information as well as calendaring and availability information for use in selection and performance rating functions of one or more of the exemplary embodiments. More specifically, data sources 110 include IME reports databases 111, healthcare provider databases 112, human resource (HR) databases 113, electronic medical records (EMR) provider database 114, EMR provider database 115, industry injury statistics databases 116, FitBit personal activity sensor database 117, Apple Watch health monitor database 118, and other databases 119. Other databases may include insurance claim data for one or more insurance companies or self-insured companies, and/or third-party administrators. In some embodiments, the data is provided by third party platforms with the express permission of their users. Also in some embodiments, the data sources may include real-time input from user-wearable sensors or other activity monitoring cameras and devices.

Data sources 110 include or are otherwise associated with respective indices (not shown). They are also coupled or couplable via a wireless or wireline communications network, such as a local-, wide-, private-, or virtual-private network, to server 120, enabling data interchange via application program interface, JavaScript Object Notation, or electronic data interchange, or any convenient or desirable way of communicating data.

Exemplary Server(s)

Server 120, which is generally representative of one or more servers for serving data in a variety of desirable form, including for example webpages or other markup language forms with associated applets, remote-invocation objects, or other related software and data structures to service clients of various "thicknesses," for example, desk top computers, tablet computers, laptop computers, mobile phones, and Internet-Of-Things (IOT) devices. More particularly, server 120 includes a processor module 121, a memory module 122, with memory module 122 including one or more functional modules and data structures to implement functionality described herein, Processor module 121 includes one or more local or distributed processors, controllers, or virtual machines. In the exemplary embodiment, processor module 121 assumes any convenient or desirable form.

Memory module 122, which takes the exemplary form of one or more non-transient electronic, magnetic, or optical data-storage devices, stores user database 123, user signup module 124, neural network or machine learning module 125, and IME ordering module 126, as well as other functional modules to carry out one of more of the functions described herein.

User data module 123 includes user-related data and machine-executable instructions sets for controlling, administering, and managing user accounts and related activities conducted through system 100. In addition to one or more application program interfaces (APIs) (not shown) for accessing external data sources 110 or portions thereof associated with users, user data module 123 includes user data structures, of which data structures 1231 is generally representative. Data structure 1231 includes a user identifier portion 1231A, which is logically associated with one or more data fields or objects 1231B-1231D.

Field 1231B includes account related data items, such as username, password, name, address, organizational identifier(s), credit card information, social media account(s), health record accounts, fitness and wellness monitor accounts, and access credentials, as well as account identifiers and access credentials for emails, calendars, web hosts, and so forth that may be used or referenced herein. Other fields include account history data, etc. Field 1231C includes organizational or user-specific decision or recommendation threshold data governing or influencing operation of one or more of the AI or machine-learning classifiers or trainers used in making predictions herein. Field 1231D includes service provider data, such as one or more lists of preferred services providers or preferred service provider ratings criteria, ratings formula, ratings thresholds, or selection thresholds for one or more medical conditions or bodily injuries.

User signup and administration module 124 includes one or more sets of machine readable and executable instructions, related data, and associated graphical user interfaces for signing up new users (hosts and affiliate medical records providers). In some embodiments, module 124 also includes application program interfaces and other integration components for interacting with external third-party data platforms, such as insurance companies, third-party administrators, electronic health records (EHR) platforms, and so forth which may be part of data sources 110.

Learning or predictor (classifier) module 125 includes machine executable instructions for causing one or more processors to predict or classify one or more insurance claims, based on associated medical records. The prediction or classification in some embodiments entails determining a likelihood of a manual or physician conducted IME on the patient and medical records yielded an indication that the patient has reached maximum medical improvement or not. Additional predictions or classifications may also be conducted.

Several exemplary classification terms are used herein for one or more embodiments, and not necessarily all embodiments. As used in some embodiments herein, MMI is defined as "the point when an injured patient's or worker's healing process is not expected to further improve with generally accepted medical treatment." As used in some embodiments herein, Permanent Partial Disability (PPD) is a physician's assessment that a patient has permanently lost some portion of the function of a body part. PPD is generally associated with a percentage disability rating, which is typically used to determine a monetary benefit payable to the injured person. As used in some embodiments herein, the terms Injury related, and injury not related refers to an IME physician determination that the injury that the employee or more generally injured claimant is claiming under workers compensation insurance is related or not related (to their claimed inability to work or perform other activities) based on the medical evidence provided, and therefore the claimed insurance benefits are not payable to the employee. If the injury is deemed related, benefits are payable to the employee. In some embodiments, there are four types of worker compensation benefits: (1) wage loss benefits, (2) medical benefits, (3) vocational rehabilitation benefits, and (4) permanent partial disability (PPD) benefits.

More particularly, as FIG. 1 shows, the exemplary classification module 125 is configured and/or organized into one or more machine executable instructional sets, modules, or submodules, namely a medical records data conditioner-filtering module 1251, a vectorizer module 1252, one or more classifier modules 1253, and one or more classifier training modules 1254.

Data conditioner-filtering module 1251, in some embodiments, includes machine-executable instructions (stored in a tangible storage medium) which cause one or more processors to receive, filter, and condition digitized patient medical records. More specifically, this entails receiving deidentified digitized patient medical records for workers comp or other types of insurance claimants, with the de-identification being compliant with applicable data privacy regulations. The received data is then filtered to reduce or eliminate potential noise, for example arguably redundant or superfluous, data that may obscure more meaningful data. To this end, some embodiments filter by selecting the first dated record (proximate the time of an injury associated with the claim), a middle or intermediate record, and a last available (most recent) record, excluding all other records from further processing. The middle or intermediate record is selected by searching for a record that differs substantially from or deviates from one or more of the prior medical records. (Some embodiments omit the filtering and process all or substantially all (for example, at least 75, 80, 85, 90, or 95% of all the medical records presented.), in contrast to the filtering approach which, in some embodiments, may exclude at least 50 percent of the medical records). Once the records are filtered in this way, the exemplary process entails conditioning the filtered medical records. Exemplary conditioning includes removing stop words, punctuation, and numbers; tokenizing the words; converting acronyms to full length phrases.

Vectorizer module 1252 includes machine executable instructions for causing one or more processors to vectorize the conditioned records in a set of data structures, known as feature vectors. In some embodiments, this entails extracting and vectorizing the conditioned set of medical records into two-, three-, four-, and/or five-word phrases (N-grams), with each N-gram having a minimum document frequency approximately 10% of the number of training files. A frequency slightly under 10%, for example 9.1, 9.2, 9.3, 9.4, 9.5, 9.6, or 9.7, 9.8, or 9.9, or 9.95, and setting the maximum number of features which keeps the most frequent N-grams from the training dataset (and from production datasets). For example, in some embodiments, the number of features is in the range of 2000-2500 for document frequencies near 10% of the training dataset size. In some embodiments, this number might increase as more training examples are added. If the number of features is too low, the accuracy typically drops off rapidly. The noted parameters allow for the exemplary classifier module to look for some rarer phrases that could be impactful in the predictions, while not overburdening it will too many phrases that may behave generally as 'noise' within the data.

For example, if compilation of all N-word phrases, for example all phrases having at least two words and no more than five, that appear in at least X documents, for example eight documents, yields a total of 2000 unique two-to-five word phrases, one embodiments converts each document into a numerical vector that has a length of 2000. Each value in the 2000-length feature vector represents a single phrase and the numerical value is the TF-IDF value for that individual document. TF means term-frequency; IDF means inverse document frequency; and TF-IDF means the product of TF and IDF. If a phrase (N-gram) does not appear in a given document, the value for its location in the vector is 0. The phrases in each vector are sorted alphabetically; so the first number in each medical record set's vector representation will be for whichever two-to-five-word phrase comes first alphabetically.

In some embodiments, the medical records are designated training records and are manually tagged to one of two or more classifications, and then used to train the classifier module 125. In these embodiments, the medical records are handled in similar manner as described for medical records undergoing actual classification as described above. Classifiers 1253, in some embodiments, include one or more of the classifiers that take the form of a binary logistic regression classifier utilizing a sigmoid activation loss function, whereas in other embodiments with 3 or more classes, the regression classifier employs a Softmax activation function. Some embodiments use other types of classifiers with other types of activation functions, such as Rectified Linear Unit (ReLU) activation function or Hyperbolic Tangent (tanh) function. In addition to Neural Network models, the classifiers may take forms, such as Support Vector Machines (SVM), Naive Bayes, Decision Trees, Random Forest, and Adaptive Boosting.

Classifier training modules 1254 includes one or more sets of machine executable instructions for training one or more the classifier modules used herein. In some embodiments, training one or more of the exemplary classifiers includes calculation of a loss function which compares each classifiers predictions to actual values from the training data, adjusting internal classifier model weights and/or parameters to minimize this loss in future predictions or classification. Some embodiments use a gradient descent approach to loss calculation. spaCy models couple gradient descent with backpropagation to update the weight values for their RNN model when training a named-entity recognition model/classifier, which is used in some embodiments to supplement the N-grams presented in the feature vectors. Alternatives to gradient descent for minimizing the loss function include Particle Swarm Optimization, Surrogate Optimization, Simulated Annealing, Stochastic Gradient Descent, Nonlinear Conjugate Gradient, and Levenberg-Marquardt Algorithm. In some embodiments, non-spaCy pre-trained named-entity-recognition models use other architectures such as bidirectional Long Short Term Memory models, feedforward neural networks, Conditional Random Field models, and Gated Recurrent Unit Networks for embedding.

In some embodiments, one or more of the machine-trained classifiers meet the following requirements: Minimum Accuracy of 70-90% for each of our models, for example 70%, 75%, 80%, 85%, and 90%; F1 Score of 70-90% for example 70%, 75%, 80%, 85%, and 90%, and/or Minimum Receiver Operating Characteristic Area Under the Curve (ROC AUC) of 80-95%. F1 Score is a metric that looks to minimize both false positives and false negatives (in some embodiments, misclassification between classes). The exemplary embodiment provides a training dataset balanced equally between the different classes, for example half the records are MM1 and half are MM2. The same is true for the training data used for subclassification of the MM1 and MM2.

Some embodiments use alternative classification or prediction methods, which are more heuristic in nature. For example, some embodiments use a keyword or phrasal counting method which entails comparing a given patient record set (which is conditioned, filtered, and/or vectorized as noted) to first and second sets of key phrases, such as a list of MM1 key phrases (those associated or highly correlated with maximum medical improvement) and MM2 key phrases (those associated or highly correlated with continued improvement likely. (In some embodiments, a threshold correlation greater than 0.3, such as 0.4, 0.5, 0.6, 0.7, defines highly correlated.) Exemplary MMI phrases include: maximum medical improvement, physical therapy, symptoms no, manual therapy, treatment options, reviewed found negative, work activities, has negative, steroid injection, well healed, negative bilaterally. And exemplary MM2 phrases include: not present, within normal limits, external rotation, unspecified sprain, has mild, has pain, numbness tingling, complaints pain, normal range motion, mild tenderness, and has positive.

In the comparison, two counts are made, one count of the number of matching phrases from the first set found in the patient record set (or more precisely feature vector representation of the record set.) and the other count of the number of matching phrases from the second set. The given patient record is assigned to the classification associated with the set having the highest count. If there is a tie in the counts or in some embodiments an insufficient difference in the two counts (for example, less than 1%, 5%, 10%, or 20% as percentage of the total sum of the two counts or of the average of the two counts in some variants), then the classification is made pursuant to a stored user-selected tie-breaker preference. For example, in some embodiments, the tiebreaker is a default selection to the MM2 (not ready for IME) classification to avoid the expense of the IME. Some embodiments use a threshold comparison based on the age of the claim, with claims older than a threshold age or within 1 or 5% of a threshold age, such as 6, 9, 12, or 18 months (measured from date of the injury or date of the first medical treatment of the injury) defaulted to a maybe or an MM1 status as a nudge toward conducting an IME. In some embodiments, the classification can be designated as indeterminant (maybe) and the injury claim marked or tagged in memory as needing a more detailed manual review.

In some embodiments, the maximum medical improvement (IME ready or IME likely to indicate maximum medical improvement) classifier is used exclusively to any additional classifiers, whereas in other embodiments, two or more binary or higher-level classifiers as described herein are used. For example, in some embodiments, an initial classifier determines the MM1 or MM2 classification, and a first set of secondary classifiers determines one or more MM1 subclasses and a second set of secondary classifiers determine one or more MM2 subclasses. For MM1 in some embodiments, patient data is classified by two secondary classifiers, the first to predict partial permanent disability (PPD) Category A (PPD=0%) or Category B (PPD>0%) and the second to predict Related Injury (1) or Not-related Injury (2). For MM2 in some embodiments, the patient data (feature vectors representation) is passed through 5 secondary classifiers (models) to predict physician answers to 5 Yes/No questions and to determine Related Injury (1) or Not-related Injury (2). Some embodiments may use a single multi-class engine to address all the primary and secondary predictions simultaneously, whereas others may use one to address the primary and a second one to simultaneously address all the secondary classifications. In some embodiments, the secondary models (classifiers) and the MM1/MM2 classifier (model 1) are the same type of model or classifier as the primary MM1/MM2 classifier, for example—Logistic Regression type. However, in some embodiments, the secondary classifiers may not only differ from the primary in type, but also from one or more of the other secondaries.

Some embodiments collect and leverage the following data in making the IME ready or not ready (that is, MM1/MM2) prediction:

Detailed job description relating to the physical demands of the position such as The specific percentage of lifting, bending and repetitive nature of the job.

Nature of injury; (FROI) First Report of Injury form completed by the injured employee.

Medical Treatment details (complete med records provided).

Claim status details—accepted or denied.

First Day of Lost time (if applicable).

Impairment rating

Applicable Claim related questions: Return to work status, Medical treatment appropriateness. Nature and extent of the claimed injury, Work restriction clarification. Maximum Medical Improvement (MMI).

IME ordering module 126 includes data and/or machine executable instructions for facilitating ordering independent medical examinations or evaluations and/or generating and presenting graphical user interface pre-examination reports based on classifier outputs. More specifically, module 126 includes an ordering module 1261 and a pre-examination report generator module 1262. Ordering module 1261 is configured to generate GUIs for managing claim and presenting those claims and classifier associated classifier outputs and medical data, and pre-examination and full IMEs in the context of an ordering system. (See below for further details on an exemplary forms and functionality.)

Pre-examination report generator 1262 generates pre-examination reports based on provided medical data and one or more classification or prediction outputs of classifier module 125. In some variants, module 1262 includes a separate set of report generation classifiers organized using multi-class classification scheme, Boolean method scheme, or text summarization. The multi-class classification system uses results of the NER module in conjunction with several specialized classifiers to fill in an IME report template framework or data structure. For example, one or more of the constituent classifiers determine, based on the named-entity-extended medical record vectors, which body part(s) were most likely to be injured, what treatments/diagnostic tests have been performed and the results, and/or the possible causes of the injury. Some embodiments also include date extraction functions to associate named entities, and events with dates, thus enabling generation of a timeline of the claimant patient's treatment and progress. The output pre-examination report follows a formulaic structure that presents the model's prediction for each relevant classifier. For example, some embodiments of a graphical user interface pre-examination report, present a structure, such as "The patient is being seen for an injury to their body part 1. The injury occurred on date 1, which is time calculation 1 days ago." The patient has received treatment 1 a total of treatment 1 count during this period, and has more likely than not reached MM1 or not reached MM1 with a confidence rating 1,"

with the body part 1, date 1, treatment 1, treatment 1 count fields determined by associated classifiers, and the time calculation 1 determined as a function of date 1, and confidence rating 1 being part of the output of classifier 125. For Boolean method variants, the pre-examine report generator predict answers to True/False or Yes/No questions concerning why a particular EHR classification, MM1 or MM2 for example, was applied in each case. This architecture includes a set of classifier models to answer a pre-determined group of questions/reasons about what lead to a certain prediction. Examples include Length of employment appropriate to develop symptoms, Job description appropriate to develop symptoms, and Pre-existing Condition contributed. The output from the pre-examine report generator would list each question/reason followed with a True/False or Yes/No as an explanation for how that question/reason played a role in the reason for MM1 or MM2 prediction. The various classification models used to answer each question/reason operate like one or more of the binary classifiers previously described.

For text summarization variants, the model condenses the EHR text into the most relevant information to answer the most important questions concerning the MM1/MM2 classification results. This can be performed via abstractive or extractive summarization techniques. Abstractive Text Summarization entails combing the EHR inputs to find the relevant information and provide an GUI report comprising sentences one or more sentences that are not quoted directly from the EHR. The output would be unique from the EHR provided. Extractive Text Summarization entails extracting actual sentences from the EHR to create the output. Some embodiments take a hybrid form, combining Abstractive and Extractive Text Summarization to create the report. In some variants, this is a simple combining of the two summarization results, whereas in others, one or more of the extractive text summarization sentences can be fed into the abstractive summarization to generate abstractive text. Each summarization in various embodiments uses deep learning techniques to construct the output. Different algorithms for text summarization include weighting sentences by word frequencies, TextRank, Recurrent Neural Networks encoder-decoder models, and sentence embeddings.

Some embodiments use provided IME summaries for validating the pre-examination report generator model, with the primary evaluation metric being the ROUGE score. ROUGE stands for Recall-Oriented Understudy for Gisting Evaluation, and computing it entails comparing the machine learning output to human-produced reference summary (the IME) by looking at the matching overlap of N-grams between the two summaries.

IME ordering module 126 provides its graphical user interface structures and other outputs to one or more access device, such as access device 130, for an insurance claims and/or other professionals, such as a lawyer, paralegal, administrative law judge, and/or to a patient concerned about whether a second or third medical opinion should be ordered.

Exemplary Access Device(s)

Access device 130, which is generally representative of one or more access devices, takes the exemplary form of a personal computer, workstation, personal digital assistant, mobile telephone, kiosk, or any other device capable of providing an effective user interface with a server or database. Specifically, access device 130 includes a processor module 131, a memory 132, a display 133, a keyboard 134, and a graphical pointer or selector 135. (In some embodiments, display 133 includes a touch screen capability.)

Processor module 131, which includes one or more processors, processing circuits, or controllers, is coupled to memory 132. Memory 132 stores code (machine-readable or executable instructions) for an operating system 136, a browser 137, and a graphical user interface (GUI) 138 (defined in whole or part by various modules within server 120). In the exemplary embodiment, operating system 136 and browser 137 not only receive inputs from keyboard 134 and selector 135, but also support rendering of GUI 138 on display 133. Upon rendering, GUI 138, shown on display 133 as GUI 138', presents data in association with one or more interactive control features (or user-interface elements). In the exemplary embodiment, each of these control features takes the form of a hyperlink or other browser-compatible command input and provides access to and control of various regions of the graphical user interfaces described herein. More particularly, GUI 138 includes, among other things, regions for users, such as claims adjusters, to access the system and request and receive reports on groups or individual worker's compensation claims, which are governed by and interact with various portions of server 120. GUI 138 may include a IME prediction region 1381 listing IME predictions for one or more claimants, a list 1382 of one or more recommended IME providers for one or more of the affirmative IME predictions (that is, predictions that actual IMEs will indicate claimant worker is ready to work or return to other activities previously constrained or prevented by injury under treatment); and/or a list 1383 of recommended or ranked or medical examination or treatment providers who may be at lower cost and/or shorter positive outcome time for the injury of one or more of the IMEs having a negative IME prediction.

Exemplary Method(s) of Operation

Figure 2:
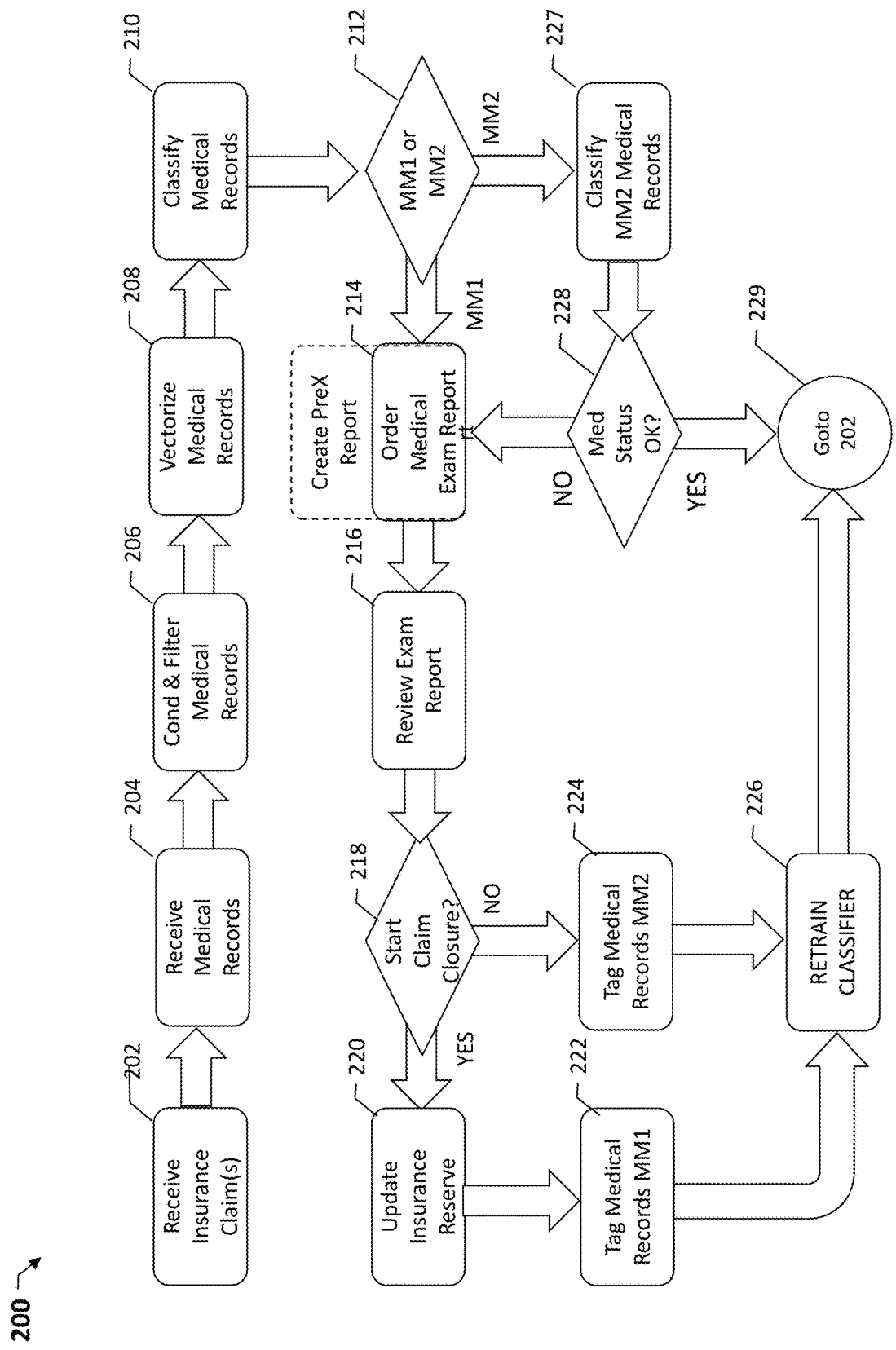
FIG. 2 is a flow chart of an exemplary method of processing medical records and/or operating a system, such as the FIG. 1 system, corresponding to one or more embodiments of the invention.

FIG. 2 shows a flow chart 200 of one or more exemplary methods of operating a medical records processing and/or medical examination prediction and ordering system, such as system 100. Flow chart 200 includes blocks or steps 202-229, which are arranged and described as a sequence in the exemplary embodiment for sake of explanatory clarity and concision. However, other embodiments may change the order of two or more of the blocks or execute two or more of the blocks in parallel, for example to facilitate processing of batches of insurance claims or medical data. Moreover, still other embodiments implement the blocks as two or more interconnected hardware modules with related control and data signals communicated between and through the modules. Thus, the exemplary process flow applies to software, hardware, and firmware implementations.

At block 202, the exemplary method begins with the receipt of one or more filed insurance claims. In some embodiments, the claims concern bodily injury and are logically associated with one or more types of insurance policies, such as commercial general liability, automobile liability, and/or workers compensation insurance. In some embodiments, the claims may pertain to legal claims, such as negligence or medical malpractice, or other bodily injury claims. In still other embodiments, the claims may pertain to other types of insurance claims where expert opinions are desired to substantiate eligibility or ineligibility of benefit payment. (Some embodiments may implement one or more portions of the exemplary systems or methods herein for use by health care consumers to provide recommendations for second opinions on their own medical treatments or those of a friend or loved one who have granted them access to relevant medical records or data.) Exemplary execution continues at block 204.

At block 204, the exemplary method begins with receipt of one or more sets or batches of electronic medical records. In some embodiments, this entails establishing a secure wide-area-network connection, for example via the Internet, with a database owned or controlled by an independent entity, such as an insurance company, a third-party administrator, a healthcare provider, or a third-party electronic health record aggregator. In some embodiments, the records are stored by the same entity operating the system. For data privacy and security, the records are generally provided in a deidentified form to ensure compliance with HIPAA. Execution continues at block 206.

Block 206 entails filtering and conditioning one or more portions of the received electronic medical records. In the exemplary embodiment, the filtering and conditioning are performed by a module such module 1251 in FIG. 1. Generally, this conditioning entails eliminating stop words and/or other words and phrases deemed irrelevant to the information value of each record and then filtering the records themselves. The filtering entails selecting the first dated record (proximate the time of an injury associated with the claim), one or more middle or intermediate records, and a last available (most recent) record from the set of available records, with the middle or intermediate records selected by searching for a record that differs substantially from or deviates from one or more of the prior medical records, generally the preceding record when one considers the records as a temporal sequence. (Some embodiments omit the filtering and process all or substantially all (for example, at least 75, 80, 85, 90, or 95% of all the medical records presented.) In some embodiments, the data is also passed through a named-entity-recognition process, which entails identifying body parts, treatment events, dates, etc. within the set of medical records for each claimant/patient. Execution then proceeds to block 208.

Block 208 entails vectorizing the filtered and/or conditioned data, for example using module 2512 in FIG. 1, producing a set of vectors representative of the data, with each vector generally representative of the medical data associated with a corresponding one of the insurance claims. Some embodiments restrict each vector to a specific bodily injury in a claim. (In the case of multiple injuries per claim, the filtering or vectorizing using the named entity recognition engine facilitates parsing records according to primary body part under treatment.) The exemplary vectorization process, as detailed previously, entails identifying two-, three-, four-, and/or five-word N-grams, with each N-gram having a minimum document frequency, for example 10% of the number of training files used to create the classifier (for machine learning implementations). For example, in some embodiments, the number of features is in the range of 2000-2500 for document frequencies near 10% of the training dataset size. Execution continues at block 210.

Figure 3:
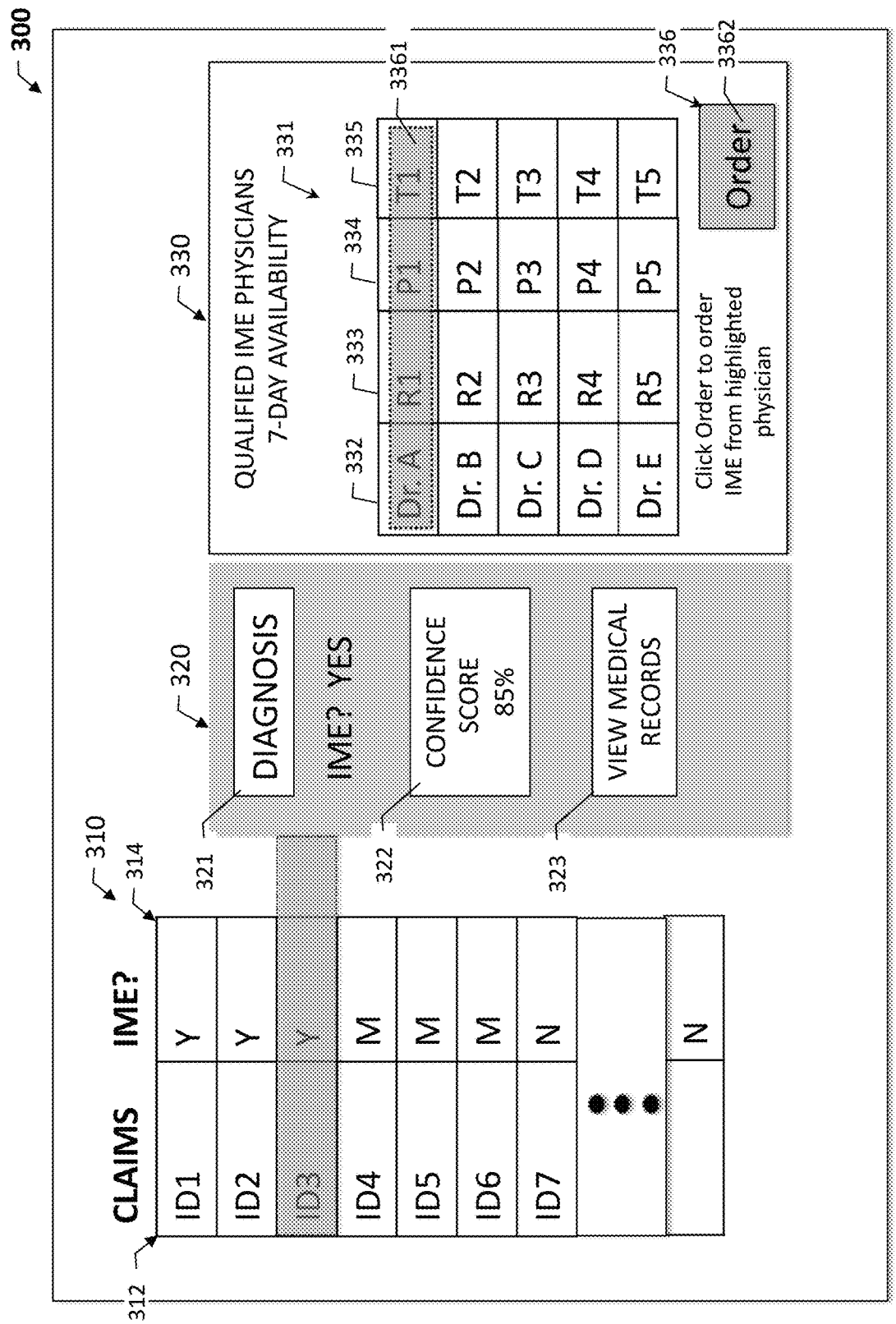
FIG. 3 is a block diagram of an exemplary graphical user interface corresponding to one or more embodiments of the present invention.

Block 210 classifies the medical data associated with each claim, that is, the feature vector for each claim, into one or more categories. In the exemplary embodiment, this entail classifying each feature vector using one or more the classification procedures associated with classifier 1254 in the FIG. 1 system. As noted, this classifier may take the form of one or more binary linear regression classifiers utilizing, for example, a sigmoid, Softmax, Rectified Linear Unit (ReLU), or Hyperbolic Tangent (tanh) activation function. The result of the classification operation is that one or more of the feature vectors (and associated insurance claims) are tagged or marked with a date stamped classification as MM1 or MM2, where MM1 denotes the prediction that an actual physician conducted IME is likely to indicate that the injured claimant has reached maximum medical recovery or improvement for the claimed injury based on standard medical care and that MM2 denotes the prediction that an actual IME would indicate that the injured claimant has not reached maximum medical recovery. Execution continues at block 212, where execution branches to block 214 for claims that are classified MM1 and to block 224 for claims that are classified MM2. At block 214, the exemplary method entails ordering an IME for one or more of the claimants associated with MM1 classified claims and/or generating a pre-examination report. In some embodiments, this ordering entails server 120 (in FIG. 1) defining and presenting via a graphical user interface (or portion thereof) on one or more access devices, such as device 130, a list of one or more claim identifiers and the associated classification or classification-related rankings (or predictions and prediction-related rankings.) For example, FIG. 3 shows an interactive graphical user interface GUI 300 used in some embodiments.

More particularly, GUI 300 includes a claim listing region 310, a claim detail region 320, and an IME order region 330. Claim listing region 310 displays a listing 312 of one or more selectable claim identifiers ID1, 1D2, . . . , 1D7 and a listing 314 of corresponding associated ranking or classification indicator field, generally designated CC in the figure. The claims are presented in an order or sequence based on its IME readiness classification or classification strength score as determined at block 210. In some embodiments, a trinary presentation of the classification is used, indicating one of three states: Y for ready for IME, N for not ready for IME, and M for maybe ready for IME. Some embodiments may omit the maybe state, whereas others may present a numerical score of readiness or classification confidence for the IME ready state. Claim detail region 320 which displayed in response to selection of a particular listed claim within region 310, for example, ID3 as shown, presents further information about the claim. In particular, region 320 includes a synopsis or diagnosis region 321, a confidence indication region 322, and a medical data access region 323. Synopsis region 321 identifies the body part or medical condition associated with the claim, for example, carpel tunnel or back injury. In some embodiments, this region includes one or more selectable portions to receive further information about the given diagnosis, such as average recovery time for the injury, and/or average costs of such claims, and/or one or more 'red flag' informational items for a claims adjuster to beware of in assessing the claims. Confidence indication region 322 provides an indication of strength of the classification indication provided by at block 210 (In FIG. 2). Medical data access region 322 is user selectable to provide further display of the underlying medical records associated with the selected claim in region 310.

In response also to selection of a particular claim, IME order region 330 provides a ranked listing 331 of one or more qualified IME physicians who are available within a predetermined time period, such as seven calendar or business days, for conducting an IME of the claimant associated with the claimant for the selected claim. In some embodiments, the calendar availability integrated into the list ensures that the physician or more generally expert service provider availability is correlated with actual claimant availability. In other words, physician availability times and check against patient availability times to ensure that both are available. Some embodiments also include data presentation or display columns 332, 333, 334, and 335, and an order command feature 336. Column 332 include one or more selectable physician identifier labels or indicators, such as Dr. A, Dr. B, Dr. C, each of which identifies a particular physician or other expert service or second opinion provider (more generally a service provider). Column 333 provides rating or ranking for one or more of the physicians or providers, for example R1-R5. In some embodiments, these ratings are based on credentials and years of experience of the associated physician or expert provider. In some embodiment, the rating is based on formulaic score involving multiple criteria, and in others it's based on average of claim adjuster and/or patient rankings on a 5-star, 10-point, or 100-point scale. Column 334 provides pricing information indicators P1-P5 associated with each of the listed services providers, each indicating a specific price quote or hourly rate for completion of an IME for a patient with the indicated diagnosis. In some embodiments, the price quotes are provided in response to active solicitation of bids in real-time or at the time of claim filing from an open or curated marketplace of expert providers. Column 335 provides information about average turnaround times T1-T5 for physicians (or other expert) between completing a physical examination and submitting an IME report based on the examination. Order command feature 336 includes a selection or highlight window 3361 which a user positions over at least one of the presented expert options and an order command button 3362 which is selectable by a user to initiate or place an order for an IME of the given claimant/patient at the next available time slot on the physician and/or patient availability calendar within the predetermined examination window. In some embodiments, initiation or placement of the order causes automatic transmission of HIPPA compliant medical data and calendared appointment (such as iCal) and electronic purchase order and/or partial payment to the associated physician or expert provider. Some embodiments also electronically transmit the calendared appointment to the insurance claimant. In some embodiments, the ordering and appointment messaging are also handled or mirrored internally within a messaging function for system 100, which provided notifications of new messages to system users, such as claims adjusters, medical service providers, and insurance claimants. Also, some embodiments allow claim adjuster users to select two or more medical service providers and initiate an auction or Request for Proposal or Quotes for providing an IME for one or more claimants.

Some embodiments include an ordering disable feature, which prevents adjusters from ordering IMEs for claimants for which there is not a sufficiently strong MM1 prediction or classification. To this end, claim adjuster user data includes an associated MM1 classification or prediction confidence threshold that gates his or her access to the order control feature. In some variants, the order control feature is altered in color to indicate that it has been disabled for a particular claim and/or adjuster, or to indicate that a managerial access PIN (personal identification number) or other access key, for example a 4-digit code or an 8-character password, may be required to be entered after invoking the order control feature to complete the ordering. In some embodiments, a claims adjuster seeking authorization would invoke an integrated messaging function, which would automatically queue up the order as a pending order requiring approval prior to transmission to a service provider for completion. In this instance, a supervisory claims adjuster would access a pending order portion of the graphical user interface and have authority to approve or disapprove of the pending order, with approved orders proceeding on for completion, and disapproved orders not.

The exemplary ordering process also automatically updates the data file or diary for the associated claim to indicate the date and time of the order, identity of the physician or expert, and expected date of submission of the IME report. Some embodiments also set automatic follow up messages, such as emails or texts or SMS messages, to the physician or expert if IME reports are not received during expected time frames. In some embodiments, some portion of physician payments are made automatically in response to submission and/or approval of the submitted IME reports. (Some embodiments may provide an online IME report authoring interface which provides a summary of the relevant medical records of the claimant for use of the physician, as well as questions (see questions listed in provisional patent application) to be answered in the IME report, streamlining IME report generation and incentivizing expert to join the open or curated marketplace.)

FIG. 2 shows that after block 214, exemplary execution advances to block 216, which entails review of one or more ordered IME reports. In some embodiments, this entails a manual review by claims adjuster to ensure completeness of the report. Some embodiments also include an automated IME report analyzer to ensure completeness and plausibility of the report. For example, the analyzer may include a binary pass-fail classifier trained on acceptable IME reports to ensure accuracy and completeness of the report, for example based on comparison to the pre-examination report generated at 214. Also, some embodiments employ a multi-class A, B, C, D, F grading classifier to assess the accuracy and completeness of the report by assigning an actual grade of the report. In embodiments employing an IME report analyzer, the result of the analysis classification, whether pass-fail or A-F grade, is added to a data record associated with the relevant physicians or expert, for use in further ordering decisions. IME reports that are determined to be unacceptable are generally returned to the authoring physician for correction or rework. For claims having acceptable IME reports, execution continues at block 218.

Block 218 entails determining whether to initiate one or more claim closures based on the results of one or more corresponding acceptable IME reports. (In a batch processing mode, multiple closures and multiple corresponding reports would be proceeding in parallel or sequentially and then queued up for batch handling by one or more adjusters.) In some embodiments, this is a manual process conducted by a claims adjuster. Some other embodiments, however, provide an automated or semiautomated function, for example facilitated by a graphical user interface used by an adjuster. More particularly, if one or more accepted IME reports indicate that maximum medical improvement has been achieved, as judged by the physician who completed and signed off on the IME reports, execution advances to block 220 to initiate closure of the claim, or to block 224.

Block 220 entails automatically or manually updating or scheduling automatic update one or more insurance reserve accounts to reflect imminent or anticipated closure of one or more insurance claims. More specifically, this generally entails generation and transmission of End-Of-Benefits notification letters or communications to the affected claimants and release of insurance reserve funds set aside to cover the associated claims within statutorily defined time frames, thereby reducing legal risks associated with having insufficient reserves, while also potentially allowing more efficient use of the released capital for operations, for benefits, for premium reductions, and/or investment. Execution continues at block 222.

Block 222 entails tagging or marking the medical records data and/or associated vector representations for the claims deemed ready for closure as MM1 records. Execution than advances to block 226 for training of the classifier based on the marked data.

If block 218 determines based on the one or more physician received IME report that one or more of the claims are not ready for closure, execution branches to block 224, which entails marking the medical records data and/or associated vector representations as MM2. This marked data is then presented to block 226 for retraining of one or more of the classifiers based on the MM2 marked data. Execution then continues at block 229 which represents a return to block 202 for receipt of new insurance claims.

FIG. 2 shows that if block 212 indicates that for claims classified as MM2, execution branches to block 227, instead of block 214.

Block 227 entails further classifying MM2 records according to one or more subclassifications. In the exemplary embodiment, this entails use of one or more binary classifiers similar in structure to the binary classifiers describe above. In particular, one MM2 subclassifier classifies the medical record data as related or unrelated to the injury for which benefits are claimed. If this classification indicates that the benefits claim is not related to the injury, some embodiments omit the other classifications and proceed to block 229. However, some embodiments continue with one or more of the following binary classifiers:

1) Current Activity Restrictions Appropriate or Inappropriate for the claimed injury:
2) Current Medical Treatment Appropriate or Inappropriate for the claimed injury:
3) Recommended Treatment Appropriate or Inappropriate for the claimed injury;
4) Work Disability Appropriate or Inappropriate for the claimed injury. Execution then advances to block 228.

Block 228 entails determining whether the status of the claim is proper or not, that is, is the claimant receiving appropriate medical treatment (and/or benefits). In the exemplary embodiment, this entails assessing the results of the MM2 classifications. Specifically, if any of the MM2 classifications indications or predictions indicate that a reasonably skilled or suitably expert physician would likely consider the medical treatment benefit inappropriate, then execution branches to block 214 with recommendation or assessment indicator that an IME be ordered for the claimant. If none of the MM2 subclassifiers indicate impropriety in the claim medical handling, then execution continues at block 229, which, as noted previously, entails returning to block 202 for receipt of new claims for processing.

CONCLUSION

In the foregoing specification, specific exemplary embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms, such as second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed. Also, the term "exemplary" is used as an adjective herein to modify one or more nouns, such as embodiment, system, method, device, and is meant to indicate specifically that the noun is provided as a non-limiting example.

What is claimed is:

1. A system comprising a non-transitory machine-readable storage medium having instructions stored thereon, which, when executed by one or more processors, cause the system to: obtain a first set of electronic medical records for two or more claimants associated with corresponding filed insurance claims for corresponding bodily injuries, the medical records for each claimant having a corresponding medical improvement status label indicating affirmatively or negatively whether the records represent achievement of maximum medical recovery for his or her bodily injury; extract a first set of one or more features from the first set of medical records; feed the first set of one or more features and corresponding medical improvement status labels into a machine learning algorithm to train a maximum medical improvement prediction model to output a binary prediction of maximum or sub-maximum medical recovery; retrieve a second set of medical records from a data store on an online network, the second set of medical records including medical records for at least one second insurance claimant associated with a corresponding filed insurance claim for a bodily injury; extract a second set of one or more features from the retrieved second set of medical records; feed the extracted second set of one or more features to the maximum medical improvement prediction model; output and store in a memory on the network a maximum medical improvement prediction for at least the second insurance claimant; generate at least a portion of a graphical user interface display having an insurance claim display region, the claim display region including identifier indicia associated with the insurance claim of the second insurance claimant, an indication of the maximum medical improvement prediction for the second insurance claimant, and a first user selectable control feature operatively associated with the second insurance claimant for causing display of a list of one or more physician identifiers for physicians determined to be qualified and available to perform an independent medical examination of the second insurance claimant, and a second user selectable control feature for electronically ordering an independent medical examination of the second insurance claimant from a selected one of the listed physicians.

2. The system of claim 1, wherein the instructions also cause one or more of the processors to exclude one or more medical records from each of the first sets of medical records from affecting the machine learning algorithm.

3. The system of claim 1: wherein the first and second sets of medical records for each corresponding insurance claimant define a corresponding temporal record sequence; and wherein the instructions further cause one or more of the processors to prevent one or more of the medical records that do not differ sufficiently from an immediately preceding medical record within its corresponding temporal record sequence from affecting training or predictions of the maximum medical recovery status prediction model.

4. The system of claim 1, wherein the machine learning algorithm is a binary logistical regression algorithm.

5. The system of claim 1, wherein the machine learning algorithm includes an activation or loss function selected from a group consisting of sigmoid, Softmax, Rectified Linear Unit (ReLU), and Hyperbolic Tangent (tanh).

6. The system of claim 1, wherein the corresponding bodily injuries for each of the first claimants and an each of the second claimants are to the same body part.

7. The system of claim 1, wherein the maximum medical recovery prediction model is configured to output a prediction confidence indicator and wherein the graphical user interface display presents a representation of the prediction confidence indication in association with the claim identifier indicia for the second insurance claimant.

8. The system of claim 1, wherein each listed physician in the graphical user interface display has a predetermined availability to conduct the independent medical examination within a predetermined time frame, such as seven days, from a current date of user selection of the first user selectable control feature.

9. The system of claim 1, wherein the instructions further cause one or more of the processors to: obtain a third set of electronic medical records for two or more claimants associated with corresponding filed insurance claims for corresponding bodily injuries, the medical records for each claimant having a corresponding proper medical status label indicating affirmatively or negatively whether the records represent proper medical status for his or her bodily injury; extract a third set of one or more features from the third set of medical records; feed the third set of one or more features and corresponding proper medical status labels into a second machine learning algorithm to train a proper medical status prediction model to output a prediction of proper or improper medical status.

10. The system of claim 9, wherein the instructions further cause one or more of the processors to: extract a fourth set of features from the second set of medical records from the maximum medical recovery prediction model; feed the extracted fourth set of one or more features to the proper maximum medical improvement prediction model in response to a prediction of sub-maximum medical recovery for the second claimant; output and store in a memory on the network a proper or improper medical status prediction for at least the second insurance claimant; generate at least a portion of the graphical user interface display an identifier indicia associated with the insurance claim of the second insurance claimant, an indication of the improper medical improvement prediction for the second insurance claimant, and a list of one or more physician identifiers for physicians determined to be qualified and available to perform an independent medical examination of the second insurance claimant within a predetermined time period, and a user selectable control feature for electronically ordering an independent medical examination of the second insurance claimant from a selected one of the listed physicians.

11. The system of claim 10, wherein the instructions further cause one or more of the processors to retrieve a fourth set of medical records from a data store on an online network, the fourth set of medical records including medical records for at least one fourth second insurance claimant associated with a corresponding filed insurance claim for a bodily injury; extract a second set of one or more features from the retrieved second set of medical records; feed the extracted second set of one or more features to the maximum medical improvement prediction model; output and store in a memory on the network a maximum medical improvement prediction for at least the second insurance claimant; generate at least a portion of a graphical user interface display having an insurance claim display region, the claim display region including identifier indicia associated with the insurance claim of the second insurance claimant, an indication of the maximum medical improvement prediction for the second insurance claimant, and a first user selectable control feature operatively associated with the second insurance claimant for causing display of a list of one or more physician identifiers for physicians determined to be qualified and available to perform an independent medical examination of the second insurance claimant within a predetermined time period, and a second user selectable control feature for electronically ordering an independent medical examination of the second insurance claimant from a selected one of the listed physicians.

12. The system of claim 10, wherein the proper or improper medical status prediction predicts whether a physician conducting an independent medical examination would consider current activity restrictions for a claimant proper or not; or current medical treatment for the claimed injury proper or not; or a recommended treatment for the claimed injury proper or not; or work disability for the claimed injury proper or not.

13. A non-transitory machine-readable storage medium having instructions stored thereon, which, when executed by one or more processors, cause the system to: obtain a first set of electronic medical records for two or more claimants associated with corresponding filed insurance claims for corresponding bodily injuries, the medical records for each claimant having a corresponding medical improvement status label indicating affirmatively or negatively whether the records represent achievement of maximum medical recovery for his or her bodily injury; extract a first set of one or more features from the first set of medical records; feed the first set of one or more features and corresponding medical improvement status labels into a machine learning algorithm to train a maximum medical improvement prediction model to output a binary prediction of maximum or sub-maximum medical recovery, wherein the first and second sets of medical records for each corresponding insurance claimant define a corresponding temporal record sequence; and wherein the instructions further cause one or more of the processors to prevent one or more of the medical records that do not differ sufficiently from an immediately preceding medical record within its corresponding temporal record sequence from affecting training or predictions of the maximum medical recovery status prediction model.

14. The storage medium of claim 13: wherein the corresponding bodily injuries for each of the first claimants and an each of the second claimants are the same body part; wherein the machine learning algorithm is a binary logistical regression algorithm; and wherein the maximum medical recovery prediction model is configured to output a prediction confidence indicator.

15. The storage medium of claim 13, wherein the instructions further cause one or more of the processors to: retrieve a second set of medical records from a data store on an online network, the second set of medical records including medical records for at least one second insurance claimant associated with a corresponding filed insurance claim for a bodily injury; extract a second set of one or more features from the retrieved second set of medical records; feed the extracted second set of one or more features to the maximum medical improvement prediction model; output and store in a memory on the network a maximum medical improvement prediction for at least the second insurance claimant; generate at least a portion of a graphical user interface display having an insurance claim display region, the claim display region including identifier indicia associated with the insurance claim of the second insurance claimant, an indication of the maximum medical improvement prediction for the second insurance claimant, and a first user selectable control feature operatively associated with the second insurance claimant for causing display of a list of one or more physician identifiers for physicians determined to be qualified and available to perform an independent medical examination of the second insurance claimant within a predetermined time period, and a second user selectable control feature for electronically ordering an independent medical examination of the second insurance claimant from a selected one of the listed physicians.

16. A non-transitory machine-readable storage medium having instructions stored thereon, which, when executed by one or more processors, cause the system to: obtain a first set of electronic medical records for two or more claimants associated with corresponding filed insurance claims for corresponding bodily injuries, the medical records for each claimant having a corresponding medical improvement status label indicating affirmatively or negatively whether the records represent achievement of maximum medical recovery for his or her bodily injury; extract a first set of one or more features from the first set of medical records; feed the first set of one or more features and corresponding medical improvement status labels into a machine learning algorithm to train a maximum medical improvement prediction model to output a binary prediction of maximum or sub-maximum medical recovery; wherein the instructions further cause one or more of the processors to: retrieve a second set of medical records from a data store on an online network, the second set of medical records including medical records for at least one second insurance claimant associated with a corresponding filed insurance claim for a bodily injury; extract a second set of one or more features from the retrieved second set of medical records; feed the extracted second set of one or more features to the maximum medical improvement prediction model; output and store in a memory on the network a maximum medical improvement prediction for at least the second insurance claimant; generate at least a portion of a graphical user interface display having an insurance claim display region, the claim display region including identifier indicia associated with the insurance claim of the second insurance claimant, an indication of the maximum medical improvement prediction for the second insurance claimant, and a first user selectable control feature operatively associated with the second insurance claimant for causing display of a list of one or more physician identifiers for physicians determined to be qualified and available to perform an independent medical examination of the second insurance claimant within a predetermined time period, and a second user selectable control feature for electronically ordering an independent medical examination of the second insurance claimant from a selected one of the listed physicians; and wherein each listed physician in the graphical user interface display has a predetermined availability to conduct the independent medical examination within a predetermined time frame, such as seven days, from a current date of user selection of the first user selectable control feature.

17. The medium of claim 16, wherein the instructions further cause one or more of the processors to: obtain a third set of electronic medical records for two or more claimants associated with corresponding filed insurance claims for corresponding bodily injuries, the medical records for each claimant having a corresponding proper medical status label indicating affirmatively or negatively whether the records represent proper medical status for his or her bodily injury; extract a third set of one or more features from the third set of medical records; feed the third set of one or more features and corresponding proper medical status labels into a second machine learning algorithm to train a proper medical status prediction model to output a prediction of proper or improper medical status.

18. The storage medium of claim 17, wherein the instructions further cause one or more of the processors to: extract a fourth set of features from the second set of medical records from the maximum medical recovery prediction model; feed the extracted fourth set of one or more features to the proper maximum medical improvement prediction model in response to a prediction of sub-maximum medical recovery for the second claimant; output and store in a memory on the network a proper or improper medical status prediction for at least the second insurance claimant; generate at least a portion of the graphical user interface display an identifier indicia associated with the insurance claim of the second insurance claimant, an indication of the improper medical improvement prediction for the second insurance claimant, and a list of one or more physician identifiers for physicians determined to be qualified and available to perform an independent medical examination of the second insurance claimant within a predetermined time period, and a user selectable control feature for electronically ordering an independent medical examination of the second insurance claimant from a selected one of the listed physicians.

* * * * *